United States Patent Office 3,078,319
Patented Feb. 19, 1963

3,078,319
PROCESS FOR MAKING ALKYL-
1,1-DIMETHYLINDANS
Thomas F. Wood, Wayne, N.J., assignor to The Givaudan
Corporation, New York, N.Y., a corporation of New
Jersey
No Drawing. Filed Mar. 2, 1960, Ser. No. 12,267
14 Claims. (Cl. 260—668)

This invention relates to 6-alkyl-1,1-dimethylindans and 6-alkyl-1,1,2-trimethylindans and a new method of producing them. More specifically it relates to the condensation of monoalkyl-substituted benzenes with 2-methyl-1,3-butadiene or 2,3-dimethyl-1,3-butadiene in the presence of acidic condensing agents to produce 6-alkyl-1,1-dimethylindans or the corresponding 6-alkyl-1,1,2-trimethylindans.

Object of this invention is to produce 6-alkyl-1,1-dimethylindans and 6-alkyl-1,1,2-trimethylindans by a simple, convenient and inexpensive process readily adaptable to commercial usage. The advancement of the art is a further object. The disclosure of a hithertofore unknown reaction is a further object.

In the past compounds of the type produced by this invention have been synthesized by expensive multistep methods usually involving formation of a Grignard reagent followed by condensation to yield a tertiary alcohol. Cyclodehydration of the tertiary alcohol by the method of Davidson and Bogert (J. Am. Chem. Soc. 56, 185 (1934)) yields the hydrocarbon 1,1-dimethylindan. Finally, alkylation is effected to produce an isomeric mixture containing 5- and 6-alkyl-1,1-dimethylindans. For example, this procedure is followed by Beets and coworkers in the synthesis of an isomeric mixture of tert.-butyl-1,1-dimethylindans (Rec. Trav. Chim. 77, 856 (1958)). A similar approach is outlined in the patent literature (Beets et al. U.S. 2,889,367 and German Patent 1,059,902). It has recently been shown that the intermediate, 1,1-dimethylindan, may be synthesized by cyclization of β-phenylisovaleric acid with polyphosphoric acid to produce 3,3-dimethyl-1-indanone followed by reduction, either catalytically or by the Wolff-Kishner method (Ferrero and Helg, Helv. Chim. Acta XLII, 2111 (1959)). While the above-mentioned methods are undoubtedly of great academic interest, it is obvious that they are unsuitable for production on a commercial scale owing to the great number of steps involved and expensive reactants employed; furthermore, it is obvious that separation of the pure 6-alkyl-1,1-dimethylindan isomer from its mixture would be quite difficult and expensive to carry out on a technical scale.

Now I have discovered that 6-alkyl-1,1-dimethylindans can be easily synthesized by a simple one-step reaction using cheap and readily available chemicals, namely, isoprene, acid catalysts, e.g., sulfuric acid, 93%, and the monoalkylbenzenes. By the process of this invention there are obtained indans having mainly the 6-alkyl-1,1-dimethylindan structure although in certain cases a minor percentage of isomers, presumably the 4 or 5-alkyl-1,1-dimethylindans, are shown to be present by the vapor phase chromatograms. In the case of the reaction of isoprene with cumene or with tert.-butylbenzene the resulting 6-isopropyl- or 6-tert.-butyl-1,1-dimethylindans are obtained in a high degree of purity as shown by their vapor phase chromatograms and comparison of their infra-red absorption spectra with that of the pure authentic hydrocarbons.

The overall reaction may be represented as follows:

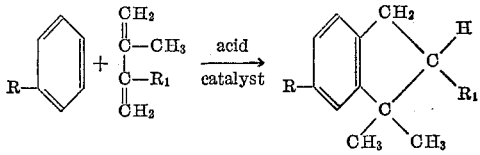

where R is a lower alkyl and $R_1$ is hydrogen or methyl.

Advantageously, the reaction is conveniently carried out by the slow addition of the "-diene" or a solution of the "-diene" in an inert solvent in the monoalkylbenzene to a cold, rapidly-stirred (−10 to 10° C.) suspension of the monoalkylbenzene in aqueous concentrated sulfuric acid (93%). The reaction temperature is maintained at −10 to 10° C. during the addition which usually requires from 2 to 3 hrs. depending on the efficiency of the cooling. After addition is completed, the mixture is stirred a short time and quenched, or the acid separated. After being washed neutral the solution is vacuum-distilled to yield the indan. An alternate mode of operation is to feed a solution of the "-indene" and all of the monoalkylbenzene slowly into the cold sulfuric acid.

It is an advantage of this process that it may be operated at low temperature under atmospheric pressure. The preferred reaction temperatures are considerably lower than the boiling point of isoprene and this reduces the hazard of fire and explosion. Furthermore, apparatus suitable for carrying out reactions under atmospheric pressure is considerably cheaper and simpler in construction and design than that required for pressure reactions.

Monoalkylbenzenes which have been successfully condensed are toluene, ethylbenzene, cumene, tert.-butylbenzene, sec.-butylbenzene and tert.-amylbenzene. Technical grades of the "-dienes," which are commercially available, have been found suitable for the process.

While, as aforesaid, aqueous sulfuric acid of about 93% concentration gives advantageous results, sulfuric acid of other concentrations, as well as other condensing catalysts may be used in accordance with the present invention. Thus, sulfuric acid within the range from about 75% to about 96% strength has been found to give desirable results. The 93% strength sulfuric acid is preferred because it is commercially available, gives excellent yields with a minimum of by-products and has a low freezing point much below the temperature of the reaction.

Other acids which may be used as condensing catalysts herein are those acids which are capable of acting as Friedel-Crafts condensing catalysts. Examples of such acids are phosphoric acid, polyphosphoric acid, boron trifluoride-water complex and hydrofluoric acid.

In carrying out the process of this invention the proportions of the ingredients may be varied over wide limits. It is preferred to use at least 1 mol and advantageously 2 to 10 mols of the monoalkylbenzene per mol of diolefin in order to minimize side reactions, such as polymerization of the diolefin. The acid catalysts may be employed in amounts varying from about 5 to about 100%, by weight, based on the monoalkylbenzene employed.

The temperature at which the process of this invention is carried out may also be varied over wide limits, i.e., from about −30° C. to about 150° C. When sulfuric acid is employed, the temperature may advantageously be from about −30° C. to about 80° C. In general, the higher the acid strength, the lower the temperature to be used. Thus, when sulfuric acid of about 75%–80% strength is used, a temperature above 50° C., preferably about 60° C. to 80° C. is desirable. When sulfuric acid of about 80% to 90% concentration is used, a temperature within the range from about 5° C. to about 50° C. is suitable. With sulfuric acid of 90%–96% strength, a temperature from about −30° C. to about 15° C., preferably from about −10° C. to 10° C., is desirable.

When milder condensing acids, such as phosphoric and polyphosphoric acids, are used, higher reaction temperatures, such as above 105°–150° C., are suitable. Anhydrous HF is active at about the same temperatures as 93% sulfuric acid, namely, −30° to 50° C. The $BF_3 \cdot H_2O$ catalyst is quite active at 25° to 35° C.

The indans formed by the process of this invention are suitable for use as chemical intermediates and intermediates for odorants, including musk odorants. For example, Beets and co-workers (Rec. Trav. Chim. 77, 856 (1958)) have shown that acetylation of compounds having the structure:

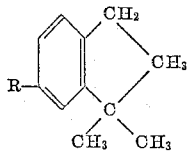

where R=tert.-butyl, sec.-butyl, tert.-amyl and isopropyl, give derivatives of musk-like odor. The identity of the corresponding hydrocarbons formed from isoprene in the process of this invention was proven by the preparation of the acetyl derivatives, which proved to be solids of musk-like odor, having melting points the same as Beets reported. In addition, it was found that the 4-(and 5-) acetyl-1,1-dimethyl-6-ethylindan, prepared starting with ethylbenzene, exhibited musk-like odor. In order to further prove the structures of the indans prepared from isoprene and cumene and tert.-butylbenzene these hydrocarbons were synthesized by classical procedures from 4-isopropylbenzaldehyde and 4-tert.-butylbenzaldehyde respectively by the method outlined by Beets and co-workers for acetyl-1,1-dimethyl-6-isopropylindan (Rec. Trav. Chim. 77, 864 (1958)). The infra-red absorption curves were similar in both cases to the corresponding indans made by the process of this invention.

In a recent patent (U.S. 2,916,529 to Sinclair Refining Company) it is stated that "the production of indan and its homologues has commercial interest in that indans are useful as intermediates in the production of the unsaturated indenes which are in turn of value since they are readily polymerized to yield valuable resins." It is thus apparent that the process of this invention may have significant commercial interest in the field of synthetic resins.

The invention is further illustrated by the following examples, without however limit it to them.

EXAMPLE I

*1,1,6-Trimethylindan*

Into a rapidly-stirred suspension of 300 g. 93% sulfuric acid and 650 g. of toluene at −4° C. was slowly added dropwise a solution of 115 g. isoprene (1.69 moles) and 200 g. toluene over a 4 hr. period keeping the reaction mixture −4 to +1° C. Stirring at this temperature was contained 40 minutes longer after the feed. The mixture was allowed to settle and the lower sulfuric acid layer separated and discarded (307 g.). The remaining oil layer was washed successively with water, 5% caustic soda solution and sodium bicarbonate solution. The excess toluene was distilled off and the residual liquid vacuum-distilled to yield as the main fraction 114 g., a colorless liquid, B.P. 55° C. (1 mm.), $n_D^{20}$ 1.5134, consisting mainly of 1,1,6-trimethylindan. Its vapor-phase chromatogram indicated 80% purity and the presence of minor amounts of isomers or by-products.

The acetyl derivative was prepared and obtained as a viscous colorless liquid, B.P. 117° (2 mm.), $n_D^{20}$ 1.5397, having a rather pleasant "acetophenone-type" odor.

EXAMPLE II

*1,1,2,6-Tetramethylindan*

Into a rapidly-stirred suspension of toluene (500 g.) in 93% sulfuric acid (150 g.), chilled to −5° C., was added dropwise with vigorous agitation a solution of 138 g. 2,3-dimethyl-1,3-butadiene (1.68 moles) in 250 g. toluene over a 3½ hour period while maintaining the temperature at −6 to 0° C. Stirring was continued for 40 minutes after the feed. After settling and discarding the sulfuric acid, the oil layer was washed successively with water (2×200 ml.), 5% caustic soda solution (100 ml.) and 5% sodium bicarbonate solution (200 ml.). After removal of toluene by distillation the residual liquid was vacuum-distilled yielding as principal product 65 g. 1,1,2,6-trimethylindan, a colorless liquid, B.P. 77–79° (3 mm.), $n_D^{20}$ 1.5131.

EXAMPLE III

*6-Ethyl-1,1-Dimethylindan*

Into a vigorously agitated suspension of 275 g. 93% sulfuric acid and 650 g. ethylbenzene, cooled to −4° C., there was added dropwise over a 2¾ hr. period a solution of 115 g. isoprene (1.69 moles) in 200 g. ethylbenzene with good agitation and cooling at −5 to 0° C. After the feed, stirring was continued in the cold for 40 minutes longer. After settling and separating the sulfuric acid, the reaction solution was washed free of acid and distilled. The excess ethylbenzene was distilled off, first using vacuum to yield the desired 6-ethyl-1,1-dimethylindan as a colorless liquid, 128 g., B.P. 65° (1 mm.), $n_D^{20}$ 1.5119. The vapor-phase chromatogram indicated a purity of over 90%.

4-(and 5-) acetyl-6-ethyl-1,1-dimethylindan was prepared by the low-temperature (−1 to +4° C.) acetylation of the hydrocarbon using acetyl chloride, aluminum chloride and carbon tetrachloride as solvent. The product was a colorless liquid, moderately viscous, B.P. 122–123° (1.5 mm.), $n_D^{20}$ 1.5335 having a musk-like odor.

EXAMPLE IV

*6-Ethyl-1,1,2-Trimethylindan*

Into a vigorously agitated suspension of 616 g. 93% sulfuric acid and 500 g. of ethylbenzene, chilled to −2° C., there was added dropwise over a 2½ hour period a solution of 138 g. 2,3-dimethyl-1,3-butadiene (1.68 moles) and 250 g. ethylbenzene with good agitation and cooling at −5 to 0° C. Stirring in the cold was continued for 40 minutes longer after the feed. After settling and separating the sulfuric acid the reaction solution was washed free of acid and vacuum-distilled over a trace of soda ash. After recovery of excess ethylbenzene there was obtained the desired 6-ethyl-1,1,2-trimethylindan as fraction, B.P. 87–87.5° C. (3.5 mm.) $n_D^{20}$ 1.5109, amounting to 68 g. The hydrocarbon is a mild-smelling colorless liquid.

EXAMPLE V

*6-Isopropyl-1,1-Dimethylindan*

Into a rapidly stirred mixture of 308 g. of 93% sulfuric acid and 684 g. cumene at −5° there was slowly added dropwise a solution of 115 g. isoprene in 200 g. cumene at such a rate that the reaction temperature could be maintained at −5 to 0° throughout the feed. Stirring was continued at 0° for 40 minutes after the feed was complete. After allowing to settle, the lower sulfuric acid layer was discarded and the remaining oil layer was washed successively with water, 5% caustic soda solution and 5% bicarbonate of soda solution. The washed solution was then subjected to vacuum-distillation, yielding besides recovered cumene, the 1,1-dimethyl-6-isopropylindan as a colorless liquid, B.P. 75–77° (3 mm.), $n_D^{20}$ 1.5084, sp. gr. 25°/25°=.8986, amounting to 168 g. The vapor-phase chromatogram indicated a purity of greater than 95%.

Acetylation at 0° in carbon tetrachloride solution yielded a mixture probably consisting of 4- and 5-acetyl-1,1 - dimethyl - 6 - isopropylindan, B.P. 114–116° C. (1 mm.), $n_D^{20}$ 1.5261, from which a crystalline isomer was obtained, M.P. 48.5–49.0° C., having a strong musk-like odor. This isomer was described as the 4-acetyl derivative by Beets (Rec. Trav. Chim. 77, 859 (1958)).

EXAMPLE VI

6-Isopropyl-1,1,2-Trimethylindan

Into a rapidly stirred mixture of 308 g. of 93% sulfuric acid and 684 g. cumene cooled to —5° there was slowly added dropwise a solution of 138 g. of 2,3-dimethyl-1,3-butadiene in 144 g. of cumene at such a rate that the reaction temperature could be maintained at —5 to 0° throughout the feed. Stirring was continued for 40 minutes after the feed. After allowing to settle in the cold (0–5°) the lower sulfuric acid layer was discarded and the remaining oil layer was washed successively with water, 5% caustic soda solution and 5% bicarbonate of soda solution. The resulting washed solution was then subjected to vacuum-distillation yielding, after removal of excess cumene, the desired indan as a colorless fraction, B.P. 92–93° (2 mm.), $n_D^{20}$ 1.5061, sp. gr. 25°/25° .8964, amounting to 123 g.

4-(and 5-)acetyl-6-isopropyl-1,1,2-trimethylindan. The acetyl derivative was prepared by feeding the above indan (79.5 g.) into a cold (0° C.) mixture of carbon tetrachloride (300 ml.) and granular aluminum chloride (59.5 g.) and acetyl chloride (40.0 g.) over a 2½ hour period. After 2 hrs. additional stirring at 1 to 3° the batch was quenched. After working up in the usual manner, the acetyl derivative was obtained by vacuum-distillation as a pale yellow viscous liquid, B.P. 125° C. (1.2 mm.), $n_D^{20}$ 1.5255, having a sweet somewhat musk-like odor.

EXAMPLE VII

6-Tert.-Butyl-1,1-Dimethylindan

Into a rapidly stirred mixture of 308 g. 93% sulfuric acid and 770 g. tert.-butylbenzene at —5° C. was slowly fed a solution of 115 g. isoprene (1.69 moles) in 154 g. tert.-butylbenzene over a 2 hr. period keeping the reaction mixture at —5 to 0° C. during the feed. The reaction mixture was stirred for 40 minutes after the feed was finished. After allowing to settle the lower sulfuric acid layer was separated and discarded. The oil layer was washed successively with water, 5% caustic soda solution and sodium bicarbonate solution. The excess tert.-butylbenzene was then distilled off (15 mm.) and the residual liquid vacuum-distilled to yield 17 g. of intermediate fraction, B.P. 35–79° (2 mm.), and 207 g. of product consisting mainly of 6-tert.-butyl-1,1-dimethylindan, B.P. 79–87° (2 mm.), $n_D^{20}$ 1.5045 to 1.5066, a colorless liquid of mild odor. There was obtained 11 g. of higher-boiling fraction (B.P. 87–92° at 2 mm.) and 34 g. of residue.

The 6-tert.-butyl-1,1-dimethylindan thus obtained was compared with the material synthesized by the method of Beets and co-workers, (Rec. Trav. Chim. 77, 865 (1958) (Compound XIIa)) by examination of infrared spectra and found to be identical. Vapor-phase chromatogram indicated purity above 95%.

Acetylation by the method of part 2 of Example I of U.S. Patent 2,889,367 gave a solid acetyl derivative having a melting point of 77–77.5° and possessing a strong musk-like odor.

EXAMPLE VIII

6-Tert.-Butyl-1,1,2-Trimethylindan

Into a cold, stirred mixture of 308 g. of 93% sulfuric acid and 770 g. of tert.-butylbenzene at —5° C. was slowly added dropwise a solution of 138 g. 2,3-dimethyl-1,3-butadiene (1.68 moles) and 154 g. tert.-butylbenzene at such a rate that the reaction mixture could be maintained at —5 to 0° C. over the 3 hr. addition time. After the feed was complete, stirring was continued for 40 minutes longer. After settling, the lower sulfuric acid layer was discarded and the oil layer was washed successively with water, 5% caustic soda solution and 5% bicarbonate of soda solution; it was then filtered through Super-Cel and vacuum-distilled over 1 gram of bicarbonate of soda. After removal of unreacted tert.-butylbenzene (B.P. 69–72° C. @ 25 mm.) there was obtained a forerun (B.P. 25–85° C. @ 1.5 mm.) amounting to 29 g. followed by the desired 1,1,2-trimethyl-6-tert.- butylindan, B.P. 88.5–92° C. (1.5 mm.), $n_D^{20}$ 1.5055, a $d_4^{20}$ 0.8970 a colorless liquid amounting to 154 g. The yield was 43.3% of theory.

EXAMPLE IX

6-Sec.-Butyl-1,1-Dimethylindan

Into a rapidly stirred mixture of 308 g. of 93% sulfuric acid and 500 g. of sec.-butylbenzene at —4° was slowly fed a solution of 155 g. of isoprene in 200 g. sec.-butylbenzene over a 4 hr. period while the reaction mixture was stirred and maintained at —4 to —1° C. during the feed. The reaction mixture was stirred in the cold for 40 minutes longer after the feed. After settling, the lower sulfuric acid layer was run off and discarded. The oil layer was washed successively with water, 5% caustic soda solution and sodium bicarbonate solution. The excess sec.-butylbenzene was distilled off at 2 mm. (B.P. 35–38°) and the residual liquid vacuum-fractionated to yield 149 g. B.P. 87–98° C. (2–3 mm. of mercury), $n_D^{20}$ 1.5130 of the 6-sec.-butyl-1,1-dimethylindan.

Acetylation was conducted at lower temperature by the usual technique to yield an acetyl derivative as a pale yellow liquid, B.P. 145–147° C. (3.5 mm.), $n_D^{20}$ 1.5244, having a musk-like odor reminiscent of ambrette seed oil.

EXAMPLE X

6-Tert.-Amyl-1,1-Dimethylindan

Into a rapidly stirred mixture of 154 g. of 93% sulfuric acid and 276 g. tert.-amylbenzene cooled to —9° C. was added dropwise a solution of 58 g. isoprene in 110 g. tert. amylbenzene over a 3 hr. period maintaining good cooling (—9 to 0° C.) and stirring. The reaction mixture was stirred at 0° C. for 40 minutes longer after the feed. The sulfuric acid was settled out and separated as a lower layer. The remaining oil layer was washed successively with water, 5% caustic soda solution and sodium bicarbonate solution. Upon vacuum fractionation there was obtained 65 g. of 6-tert.-amyl-1,1-dimethylindan a colorless liquid, B.P. 92–96° C. (2 mm.), $n_D^{20}$ 1.5050, $d_4^{20}$ 0.8958. Analysis by vapor-phase chromatogram indicated a purity of 93%.

4- (and 5-) Acetyl-6-Tert.-Amyl-1,1-Dimethylindan

Fifty-six and one-half grams of the above indan were acetylated at low temperature using 40 g. granular aluminum chloride, 27 g. acetyl chloride and 200 ml. carbon tetrachloride as solvent. After working up in the usual manner the acetyl derivative was obtained as a colorless liquid, B.P. 142–144.5° C. (3 mm.), $n_D^{20}$ 1.5210, having a musk-like odor. This fraction became partially crystalline on standing. The solid part was separated and purified by recrystallization from methanol to give colorless crystals, M.P. 47–50° C., having a musk-like odor.

When the experiments set forth in the foregoing Examples I to X were repeated, using —10° C. to 10° C. as the temperature range for the reaction, it was found that substantially the same results were obtained as set forth in the foregoing examples.

The foregoing illustrates the invention, which however is not to be limited thereby but is to be construed as

I claim:

1. The process for preparing alkyl-1,1-dimethylindans, unsubstituted in the 3-position, which comprises reacting a lower alkyl-substituted benzene with a member selected from the group consisting of isoprene and 2,3-dimethyl-1,3-butadiene in the presence of an acid catalyst useful in bringing about Friedel-Crafts reactions, at a temperature within the range from about −30° C. to about 150° C.

2. The process of claim 1, wherein said member is isoprene.

3. The process of claim 1, wherein said catalyst is aqueous sulfuric acid of about 75 to about 96% concentration and said temperature is within the range from about −30° C. to about 80° C.

4. The process of claim 1, wherein the catalyst is sulfuric acid of about 93% concentration and the temperature is within the range from about −10° C. to about 10° C.

5. The process for preparing 1,1,6-trimethylindan, which comprises reacting toluene and isoprene in the presence of sulfuric acid of about 93% concentration at a temperature within the range from about −10° C. to 10° C.

6. The process for preparing 1,1,2,6-tetramethylindan, which comprises reacting toluene with 2,3-dimethyl 1,3-butadiene in the presence of sulfuric acid of about 93% concentration at a temperature within the range from about −10° C. to 10° C.

7. The process for preparing 6-ethyl-1,1-dimethylindan, which comprises reacting ethyl benzene and isoprene in the presence of sulfuric acid of about 93% concentration at a temperature within the range from about −10° C. to 10° C.

8. The process for preparing 6-ethyl-1,1,2-trimethylindan, which comprises reacting ethylbenzene with 2,3-dimethyl-1,3-butadiene in the presence of sulfuric acid of about 93% concentration at a temperature within the range from about −10° C. to 10° C.

9. The process for preparing 6-isopropyl-1,1-dimethylindan which comprises reacting cumene and isoprene in the presence of sulfuric acid of about 93% concentration at a temperature within the range from about −10° C. to 10° C.

10. The process for preparing 6-isopropyl-1,1,2-trimethylindan, which comprises reacting cumene with 2,3-dimethyl-1,3-butadiene in the presence of sulfuric acid of about 93% concentration at a temperature within the range from about −10° C. to 10° C.

11. The process for preparing 6-tertiary-butyl-1,1-dimethylindan, which comprises reacting tertiary-butyl benzene with isoprene in the presence of sulfuric acid of about 93% concentration at a temperature within the range from about −10° C. to 10° C.

12. The process for preparing 6-tertiary-butyl-1,1,2-trimethylindan, which comprises reacting tertiary-butyl benzene with 2,3-dimethyl-1,3-butadiene in the presence of sulfuric acid of about 93% concentration at a temperature within the range from about −10° C. to 10° C.

13. The process for preparing 6-secondary-butyl-1,1-dimethylindan, which comprises reacting secondary-butyl benzene with isoprene in the presence of sulfuric acid of about 93% concentration at a temperature within the range from about −10° C. to 10° C.

14. The process for preparing 6-tertiary-amyl-1,1-dimethylindan, which comprises reacting tertiary-amyl benzene with isoprene in the presence of sulfuric acid of about 93% concentration at a temperature within the range from about −10° C. to 10° C.

References Cited in the file of this patent

UNITED STATES PATENTS

| | | |
|---|---|---|
| 1,934,123 | Hoffman et al | Nov. 7, 1933 |
| 2,603,655 | Strain | July 15, 1952 |
| 2,752,404 | Polak | June 26, 1956 |
| 2,815,381 | Carpenter et al. | Dec. 3, 1957 |

FOREIGN PATENTS

| | | |
|---|---|---|
| 796,130 | Great Britain | June 4, 1958 |

UNITED STATES PATENT OFFICE
CERTIFICATE OF CORRECTION

Patent No. 3,078,319            February 19, 1963

Thomas F. Wood

It is hereby certified that error appears in the above numbered patent requiring correction and that the said Letters Patent should read as corrected below.

Column 2, line 14, after "solvent" insert -- or --; line 24, for '"-indene"' read -- "-diene" --; column 6, line 36, for "lower" read -- low --.

Signed and sealed this 20th day of August 1963.

SEAL)
Attest:

ERNEST W. SWIDER
Attesting Officer

DAVID L. LADD
Commissioner of Patents